(12) United States Patent  (10) Patent No.: US 9,088,742 B2
Kimura  (45) Date of Patent: Jul. 21, 2015

(54) X-RAY DETECTOR AND METHOD OF DRIVING THE SAME

(75) Inventor: Hisashi Kimura, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 838 days.

(21) Appl. No.: 13/301,461

(22) Filed: Nov. 21, 2011

(65) Prior Publication Data

US 2012/0161017 A1  Jun. 28, 2012

(30) Foreign Application Priority Data

Dec. 22, 2010 (KR) ........................ 10-2010-0132827

(51) Int. Cl.
*G01T 1/24* (2006.01)
*H04N 5/359* (2011.01)
*H04N 5/32* (2006.01)
*H04N 5/374* (2011.01)

(52) U.S. Cl.
CPC .............. *H04N 5/3597* (2013.01); *H04N 5/32* (2013.01); *H04N 5/374* (2013.01)

(58) Field of Classification Search
USPC ...................................... 250/370.1
See application file for complete search history.

(56) References Cited

U.S. PATENT DOCUMENTS

| 5,668,375 A | * | 9/1997 | Petrick et al. ............ 250/370.09 |
| 2003/0197800 A1 | | 10/2003 | Petrick et al. |
| 2003/0227997 A1 | * | 12/2003 | Petrick et al. ................ 378/98.8 |
| 2006/0192130 A1 | | 8/2006 | Yagi |
| 2007/0152917 A1 | | 7/2007 | Moon |
| 2009/0238325 A1 | | 9/2009 | Kargar et al. |

FOREIGN PATENT DOCUMENTS

| JP | 2004-000564 A | 1/2004 |
| KR | 10-2002-0040286 A | 5/2002 |
| KR | 10-2005-0123173 A | 12/2005 |
| KR | 10-0786128 B1 | 12/2007 |

* cited by examiner

*Primary Examiner* — David Porta
*Assistant Examiner* — Shun Lee
(74) *Attorney, Agent, or Firm* — Knobbe Martens Olson & Bear LLP

(57) ABSTRACT

An X-ray detector is disclosed. According to one aspect, the X-ray detector includes a plurality of light sensing pixels each including a photodiode for generating an electrical detection signal corresponding to incident light and a switching device for transmitting the detection signal. The X-ray detector additionally includes a gate driver for supplying a gate pulse to the switching device via a plurality of gate lines. The gate pulse may be configured to turn on the switching device. The X-ray detector also includes a read out integrated circuit for reading out the detection signal from the plurality of light sensing pixels. During a scrubbing period, in which gate scanning is performed at least once to initialize the photodiodes of the plurality of light sensing pixels, a plurality of gate pulses are supplied to each gate line during each gate scan.

8 Claims, 7 Drawing Sheets

FIG. 7

| NUMBER OF TIMES OF GATE SCANNING | GATE-ON TIME | | | | | | | | | |
|---|---|---|---|---|---|---|---|---|---|---|
| | 5μs | 10μs | 15μs | 20μs | 30μs | 40μs | 60μs | 80μs | 100μs |
| 0 | | | | | | | | | |
| 1 | 16383 | 16383 | 16383 | 15218 | 13446 | 12436 | 11194 | 10701 | 10322 |
| 2 | 16383 | 11650 | 9202 | 7855 | 6316 | 5425 | 4354 | 3850 | 3440 |
| 3 | 13639 | 8561 | 6751 | 5737 | 4577 | 3897 | 3048 | 2629 | 2284 |
| 4 | 10991 | 6977 | 5522 | 4691 | 3718 | 3131 | 2394 | 2031 | 1736 |
| 5 | 9296 | 5998 | 4756 | 4032 | 3164 | 2636 | 1979 | 1657 | 1399 |
| 6 | 8125 | 5316 | 4217 | 3560 | 2763 | 2281 | 1687 | 1398 | 1169 |
| 7 | 7266 | 4805 | 3805 | 3196 | 2456 | 2012 | 1469 | 1207 | 1001 |
| 8 | 6608 | 4404 | 3475 | 2904 | 2213 | 1799 | 1298 | 1060 | 872 |
| 9 | 6083 | 4076 | 3203 | 2664 | 2014 | 1627 | 1163 | 942 | 771 |
| 10 | 5655 | 3801 | 2972 | 2461 | 1846 | 1483 | 1051 | 846 | 688 |
| 11 | 5296 | 3564 | 2775 | 2288 | 1705 | 1362 | 957 | 766 | 620 |
| 12 | 4989 | 3357 | 2602 | 2137 | 1583 | 1258 | 878 | 699 | 562 |
| 13 | 4723 | 3175 | 2450 | 2005 | 1476 | 1169 | 809 | 642 | 513 |
| 14 | 4490 | 3013 | 2315 | 1888 | 1383 | 1090 | 750 | 592 | 471 |
| 15 | 4285 | 2867 | 2195 | 1784 | 1300 | 1020 | 698 | 548 | 433 |
| 16 | 4098 | 2734 | 2086 | 1690 | 1226 | 959 | 651 | 509 | 400 |
| 17 | 3930 | 2615 | 1987 | 1605 | 1159 | 903 | 610 | 474 | 371 |
| 18 | 3777 | 2505 | 1897 | 1528 | 1099 | 853 | 573 | 444 | 345 |
| 19 | 3636 | 2403 | 1814 | 1457 | 1043 | 808 | 540 | 416 | 322 |
| 20 | 3437 | 2310 | 1738 | 1393 | 993 | 767 | 509 | 391 | 301 |

X-RAY DETECTOR AND METHOD OF DRIVING THE SAME

CROSS-REFERENCE TO RELATED APPLICATION

This application claims the benefit of Korean Patent Application No. 10-2010-0132827, filed on Dec. 22, 2010, in the Korean Intellectual Property Office, the disclosure of which is incorporated herein in its entirety by reference.

BACKGROUND

1. Field

The disclosed technology relates to X-ray detectors and methods for driving X-ray detectors.

2. Description of Related Technology

X-rays are transmitted easily through objects due to their short wavelengths. The amount of X-rays transmitted through an object is dependent on the internal density of the object through which the X-rays are traveling. As a result, the interior of an object may be indirectly imaged based on an amount of X-rays transmitted through the object.

An X-ray detector is a device for detecting an amount of X-rays transmitted through an object. The X-ray detector may detect an amount of X-rays transmitted through an object and display an interior of the object on a display device. The X-ray detector may generally be used as a medical testing device and as a minimally evasive testing device.

Currently, flat panel digital radiography (DR) devices employing DR methods requiring no film has been widely used to display X-ray images.

An X-ray detector is initialized by performing scrubbing. The scrubbing is performed by repeatedly performing gate scanning. The X-ray detector may remove image lags of previously captured images through the scrubbing operation.

SUMMARY OF CERTAIN INVENTIVE ASPECTS

One or more embodiments describe X-ray detectors and methods of driving the same, in which an initialization time of the X-ray detectors is reduced while maintaining image lag removal efficiency.

According to one aspect, an X-ray detector is disclosed. The X-ray detector includes a plurality of light sensing pixels each comprising a photodiode configured to generate an electrical detection signal corresponding to incident light and a switching device for transmitting the detection signal, a gate driver configured to supply a gate pulse to the switching device via a plurality of gate lines, wherein the gate pulse turns on the switching device, and a read out integrated circuit configured to read out the detection signal from the plurality of light sensing pixels. During a scrubbing period, in which a gate scan is performed at least once to initialize the photodiodes of the plurality of light sensing pixels, a plurality of gate pulses are supplied to each gate line during each gate scan.

According to another aspect, a method of driving an X-ray detector is disclosed. The method includes, during a scrubbing period in which gate scanning is performed at least once to initialize photodiodes of a plurality of light sensing pixels formed in the X-ray detector, generating a gate pulse for turning on a switching device formed in each of the plurality of light sensing pixels, the gate pulse configured to transmit a detection signal from the photodiodes of the plurality of light sensing pixels. The method further includes transmitting the gate pulse to the switching device of each of the plurality of light sensing pixels via a plurality of gate lines, and outputting the detection signal from the plurality of light sensing pixels through a plurality of data lines. Additionally, generating the gate pulse includes generating a plurality of gate pulses for each of the gate lines during each gate scan.

BRIEF DESCRIPTION OF THE DRAWINGS

The above and other features and advantages of the present invention will become more apparent by describing in detail exemplary embodiments thereof with reference to the attached drawings in which:

FIG. 7 is a table showing initialization effects according to a number of gate scans and gate-on time according to some embodiments;

DETAILED DESCRIPTION OF CERTAIN INVENTIVE EMBODIMENTS

The present invention will now be described more fully with reference to the accompanying drawings, in which exemplary embodiments are shown. Descriptions of elements or operations which may be implemented by one of skill in the art may be omitted.

The description and the drawings are not provided for limitation, and the scope of the invention should be defined by the appended claims. The meaning of the terms used in the present specification and claims should be construed so as not to depart from the spirit and scope of the invention.

Hereinafter, some embodiments will be described with reference to the attached drawings.

Figure 1:
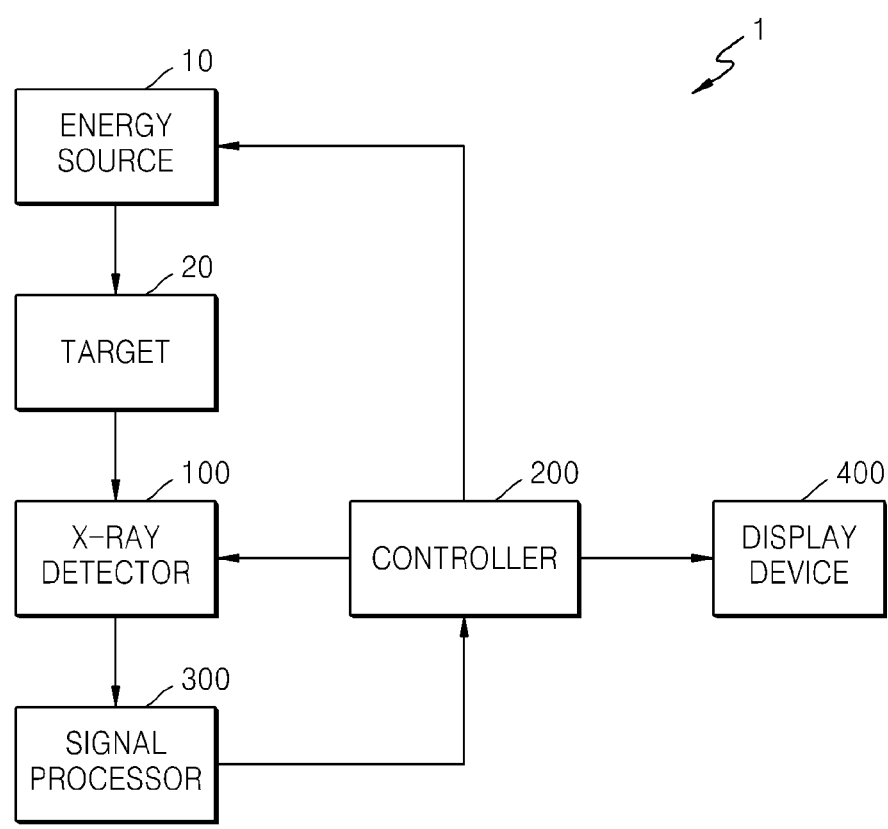
FIG. 1 is a block diagram illustrating an X-ray detection system, according to some embodiments.

FIG. 1 is a block diagram illustrating an X-ray detection system 1, according to some embodiments.

With reference to FIG. 1, the X-ray detection system 1 includes an energy source 10, an X-ray detector 100, a controller 200, a signal processor 300, and a display device 400.

The energy source 10 is a device for sending radiation such as X-rays toward a target 20.

The X-ray detector 100 includes a plurality of light sensing units for sensing X-rays in a flat panel. The X-ray detector 100 includes a plurality of photodiodes and a plurality of switching devices that are capable of detecting an amount of X-rays transmitted through the target 20. When a reverse bias is applied to the photodiodes and X-rays are applied to the photodiodes, an electrical detection signal corresponding to a transmission amount of the X-rays is generated in each of the photodiodes. The detection signals are read out and are then input to a read out integrated circuit 150 via a plurality of data lines DL.

The X-ray detector 100 performs an offset read out for obtaining an offset image when X-rays are not emitted and an X-ray read out for obtaining an X-ray image when X-rays are emitted. In addition, the X-ray detector 100 performs offset adjustment by performing gate scanning before performing the offset read out and performs signal initialization by performing gate scanning before performing the X-ray read out. When the X-ray detector 100 performs the offset adjustment, gate scanning may be performed at least twice.

The controller 200 controls operations of the energy source 10, the X-ray detector 100, and the display device 400 to generate an offset-corrected X-ray image. The controller 200 controls when and for how long the energy source 10 radiates X-rays. The controller 200 also controls driving sequences for obtaining an offset image of the X-ray detector 100 and for obtaining an X-ray image.

The signal processor 300 converts the electrical signals output from the X-ray detector 100 into a digital signal. The signal processor 300 generates an offset image and an X-ray image from the digital signal. The current offset image may then be averaged with a previously generated offset image to obtain an updated offset image. The signal processor 300 generates an offset-corrected X-ray image by subtracting the updated offset image, which is generated before X-rays are radiated, from the X-ray image.

The controller controls the display device 400 such that the offset-corrected X-ray image is displayed. The display device 400 may be a liquid crystal display (LCD), an organic light-emitting display device, a plasma display panel, or the like.

Figure 2:
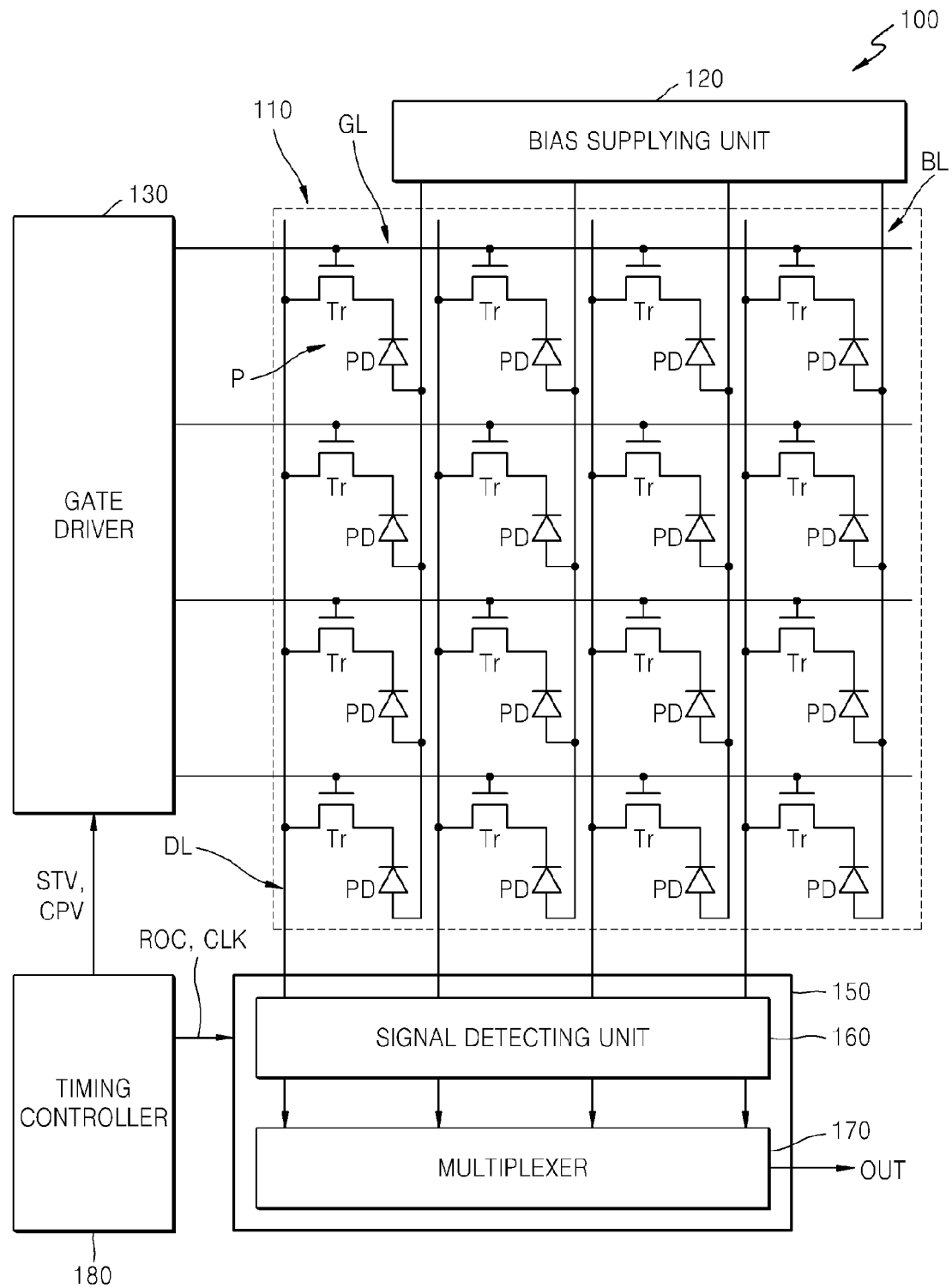
FIG. 2 is a schematic view illustrating a structure of the X-ray detector of FIG. 1, according to some embodiments.
Figure 3:
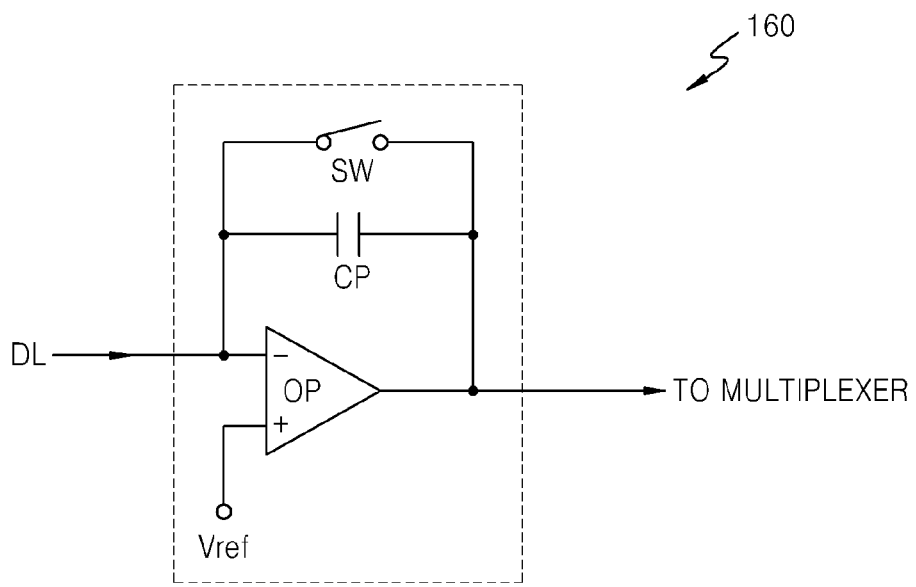
FIG. 3 is a schematic circuit diagram of a signal detecting unit illustrated in FIG. 2.

FIG. 2 is a schematic circuit diagram illustrating the X-ray detector 100 of FIG. 1, according to some embodiment. FIG. 3 is a schematic circuit diagram illustrating one of a plurality of amplifying units included in a signal detecting unit 160 of FIG. 2.

The X-ray detector 100 includes a pixel unit 110, a bias supplying unit 120, a gate driver 130, a read out integrated circuit 150, and a timing controller 180. The read out integrated circuit 150 includes a signal detecting unit 160 and a multiplexer 170.

The pixel unit 110 senses X-rays radiated from the energy source 10 and performs photoelectric conversion on the sensed signals to generate converted signals. The converted signals are output as electrical signals to the readout integrated circuit 150. The pixel unit 110 includes a plurality of light sensing pixels P arranged in matrix form. The matrix is formed to correspond to intersections where a plurality of gate lines GL and the plurality of data lines DL intersect one another. The plurality of gate lines GL and the plurality of data lines DL may intersect one another substantially perpendicularly. FIG. 2 illustrates sixteen light sensing pixels P arranged in four columns and four rows. However, one of skill in the art will recognize that the number of light sensing pixels P is not limited thereto and may be varied.

Each of the light sensing pixels P includes a photodiode PD that senses X-rays and outputs a detection signal such as a photodetection voltage. The pixels P also include a switching device Tr for transmitting the detection signal output from the photodiode PD in response to a gate pulse. The switching device Tr may be, for example, a transistor, but is not limited thereto. Hereinafter, the switching device Tr will be described as a transistor.

Each of the photo diodes PD senses X-rays radiated from the energy source 10 and generates a signal with respect to the sensed X-rays. The photo diodes PD outputs the signals as detection signals. The photo diodes PD photoelectrically converts incident light into electrical signals. For example, the photo diodes PD and may be PIN diodes. First electrodes of the photo diodes PD may be electrically connected to first electrodes of the transistors Tr. Second electrodes of the photo diodes PD may be electrically connected to a plurality of bias lines BL to which a bias voltage is applied.

The transistors Tr are configured as switching devices for controlling output of electrical signals from the photo diodes PD. Gate electrodes of the transistors Tr may be electrically connected to the gate lines GL, and source electrodes of the transistors Tr may be electrically connected to the read out integrated circuit 150 via the data lines DL.

The bias supplying unit 120 applies a driving voltage to the plurality of bias lines BL. The bias supplying unit 120 may selectively apply a reverse bias or a forward bias to the photodiodes PD.

The gate driver 130 sequentially applies gate pulses having a gate-on voltage level to the plurality of gate lines GL. A gate-on voltage level refers to a voltage level that turns on the transistors Tr of the light sensing pixels P. The transistors Tr of the light sensing pixels P are turned on in response to the gate pulses.

When the transistors Tr are turned on, detection signals output from the photodiodes PD are input to the read out integrated circuit 150 via the transistors TR and the data lines DL. The gate driver 130 may be in the form of an integrated circuit (IC). The gate drive 130 may be mounted on a side of the pixel unit 110 or may be formed directly on a substrate such as a substrate of the pixel unit 110 through a thin film process.

The read out integrated circuit 150 reads out detection signals output from the transistors Tr when the transistors Tr are turned on in response to gate pulses. The read out integrated circuit 150 reads out the detection signals output from the light sensing pixels P during the offset read out phase. The offset read out phase is a phase in which an offset image is read out Additionally, the read out integrated circuit 150 readouts the detection signals during the X-ray read out phase, in which detection signals are read out after an X-ray exposure.

The read out integrated circuit 150 may include the signal detecting unit 160 and the multiplexer 170.

The signal processor 160 includes the plurality of amplifying units respectively corresponding to the plurality of data lines DL. As illustrated in FIG. 3, each amplifying unit includes an amplifier OP, a capacitor CP, and a reset device SW.

With reference to FIG. 3, the amplifier OP includes a first input terminal connected to one data line DL, a second input terminal that receives a reference voltage Vref, and an output terminal. The reference voltage Vref may be a ground voltage. The first input terminal may be an inverse input of the amplifier OP, and the second input terminal may be a non-inverse input of the amplifier OP. A signal output from the output terminal of the amplifier OP is input to the multiplexer 170.

One end of the capacitor CP is electrically connected to the first input terminal of the amplifier OP, and another end of the capacitor CP is electrically connected to the output terminal of the amplifier OP.

A reset device SW discharges a voltage charged in the capacitor CP and resets the capacitor CP. The reset device SW is connected to the capacitor CP in parallel. One end of the reset device SW is electrically connected to a first end of the capacitor CP, and another end of the reset device SW is electrically connected to a second end of the capacitor CP. The reset device SW may include a switch that is configured to electrically connect two ends of the capacitor CP. When the switch of the reset device SW is turned on, the two ends of the capacitor CP may be electrically connected to each other, and a voltage charged between the two ends of the capacitor CP is discharged. The switch of the reset device SW is turned on during a gate scanning mode, and a current input by the data line bypasses the capacitor CP.

With returned reference to FIG. 2, the multiplexer 170 receives a voltage signal from the amplifier OP of the signal detecting unit 160, and sequentially outputs the voltage signal to the signal processor 300. The multiplexer 170 may include switches respectively corresponding to the amplifiers OP.

In order to control an operation of the gate driver 130, the timing controller 180 generates a start signal STV and a clock signal CPV and outputs them to the gate driver 130. Furthermore, in order to control an operation of the read out integrated circuit 150, the timing controller 180 generates a read out control signal ROC and a read out clock signal CLK and outputs them to the read out integrated circuit 150. The gate driver 130 and the read out integrated circuit 150 may operate using different clock signals.

Figure 4:
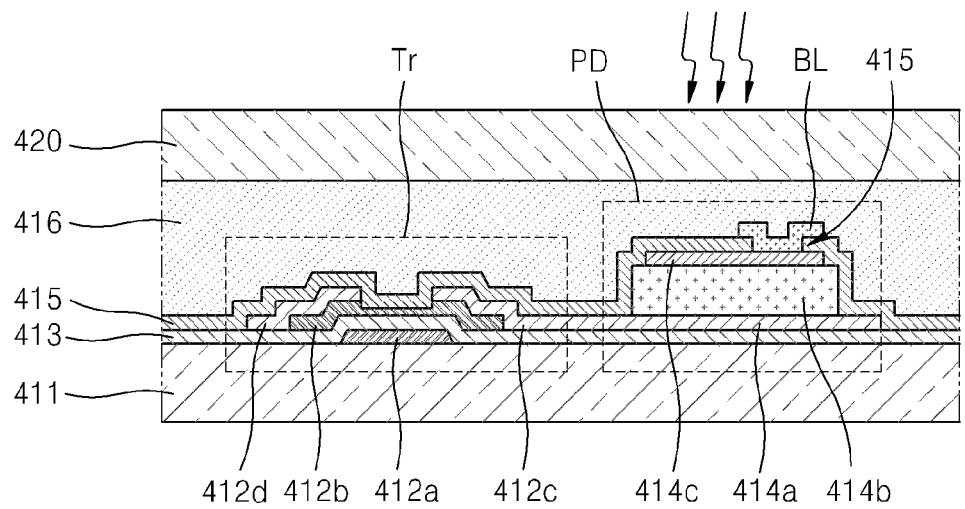
FIG. 4 is a cross-sectional view illustrating a light sensing pixel illustrated in FIG. 2.

FIG. 4 is a cross-sectional view illustrating one light sensing pixel P illustrated in FIG. 2, according to some embodiments.

With reference to FIG. 4, the light sensing pixel P includes a transistor Tr and a photodiode PD formed on a base substrate 411. The transistor Tr may include a gate electrode 412a, an active pattern 412b, a first electrode 412c, and a second electrode 412d. The photodiode PD may include a first electrode 414a, a photo conductive layer 414b, and a second electrode 414c.

The base substrate 411 may be formed as a plate. The base substrate 411 may be formed of a transparent material such as glass, quartz, polycarbonate, synthetic resins, or the like.

The gate electrode 412a of the transistor Tr is formed on the base substrate 411. The gate electrode 412a may protrude from one gate line GL, and may be formed of a material used to form the gate lines GL. The material may be, for example, aluminum (Al) or an aluminum alloy.

The gate electrode 412a is covered by a gate insulating layer 413. The gate insulating layer 413 may be formed of, for example, a silicon nitride (SiNx) or a silicon oxide (SiOx).

The active pattern 412b of the transistor Tr is formed on the gate insulating layer 413. The active pattern 412b may include, for example, a channel layer formed on the gate insulating layer 413 and an ohmic contact layer formed on the channel layer. The channel layer may include amorphous silicon (a-Si), and the ohmic contact layer may include amorphous silicon (n+a-Si or p+a-Si) doped with high density ions.

The first electrode 412c and the second electrode 412d of the transistor Tr are formed on the active pattern 412b, and the first electrode 412c and the second electrode 412d are spaced apart from each other by a predetermined interval. The first electrode 412c and the second electrode 412d may be formed of a material used to form the data lines DL, e.g., molybdenum (Mo), a molybdenum-tungsten (MoW) alloy, chromium (Cr), tantalum (Ta), titanium (Ti), or the like.

The first electrode 414a of the photo diode PD and the first electrode 412c of the transistor Tr are formed as a single body on the gate insulating layer 413 so as to be electrically connected to each other.

The photo conductive layer 414b is formed on the first electrode 414a of the photodiode PD. Although not shown in FIG. 4, the photo conductive layer 414b may have a structure in which an n-type silicon layer, an intrinsic silicon layer, and a p-type silicon layer are sequentially stacked.

The second electrode 414c of the photodiode PD is disposed on an opposite surface of the photo conductive layer 414b to the first electrode 414a. The second electrode 414c of the photodiode PD may include a transparent conductive material such as indium tin oxide (ITO) so that X-rays may be applied to the photo conductive layer 414b.

A passivation layer 415 is formed over the entire surface of the base substrate 411 to cover the photodiode PD and the transistor Tr. The passivation layer 415 may be formed of, for example, SiNx or SiOx.

A contact hole for exposing the second electrode 414c of the photo diode PD is formed in the passivation layer 415. The bias line BL may be electrically connected to the second electrode 414c of the photo diode PD through the contact hole.

An insulating layer 416 may further be formed over an entire surface corresponding to the base substrate 411 so as to cover the passivation layer 415 and the bias line BL.

A scintillator 420 is formed on the pixel unit 110 on the insulating layer 416. The scintillator 420 changes X-rays emitted from the energy source 10, passed through the target 20, and incident on the scintillator 420 as green light having a visible ray wavelength of about 550 nm. The scintillator 420 emits the green light toward the pixel unit 110. The scintillator 420 may be formed of cesium iodide, but is not limited thereto.

Figure 5:
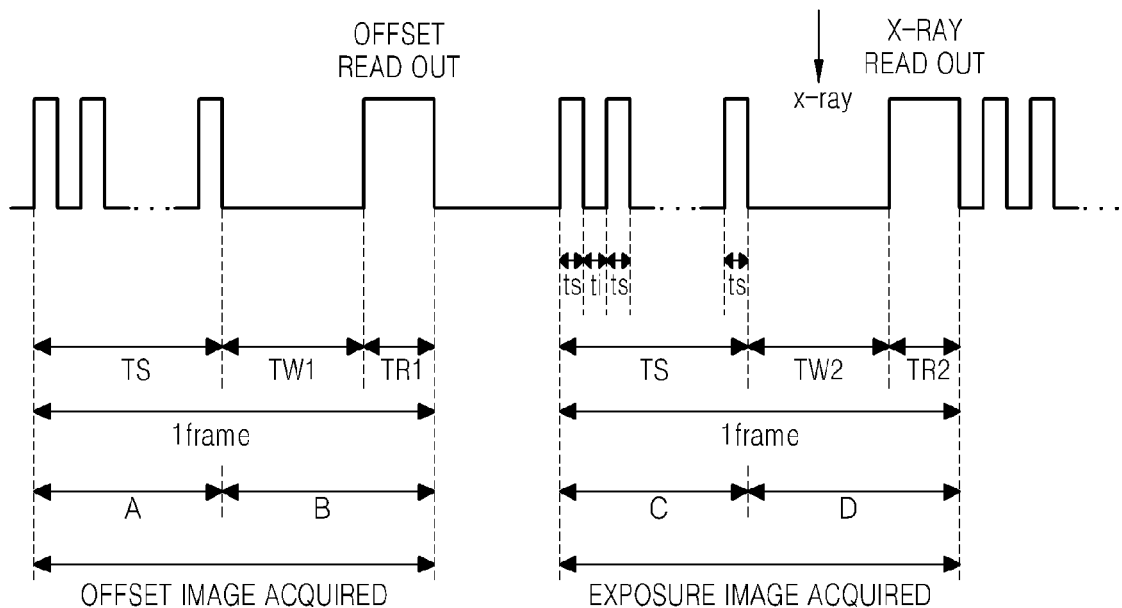
FIG. 5 is a timing diagram illustrating a method of generating an offset image and an X-ray image according to some embodiments.

FIG. 5 is a timing diagram illustrating a method of generating an offset image and an X-ray image according to some embodiments.

With reference to FIG. 5, the X-ray detector 100 obtains an offset image through a read out operation that is performed without radiating X-rays during an offset image acquisition period, and obtains an X-ray image through a read out operation that is performed after radiating X-rays during an exposure image acquisition period.

The offset image acquisition period includes a first scrubbing period A and an offset read out period B.

During the first scrubbing period A, the X-ray detector 100 performs gate scanning n times. The value of n may take on any number of values. According to some embodiments, n is greater than or equal to two. A gate scanning time ts corresponds to a time when a gate pulse is sequentially applied from a first gate line to a last gate line to perform gate scanning. A gate scanning internal ti between gate scannings may be 0. Gate scanning is performed n times during a total gate scanning time TS.

A gate pulse is sequentially applied from the gate driver 130 to the plurality of gate lines GL, and each row of transistors Tr is sequentially turned on by the gate pulse. Next, the transistors Tr are turned off. Here, the reset devices SW of the signal detecting unit 160 are turned on and electrically connected to the two ends of the capacitors CP. Electrical signals of the data lines DL are discharged by the reset devices SW. That is, data that is collected during scrubbing is discarded. When gate scanning is completed, the reset devices SW are turned off. Additionally, during the first scrubbing period A, each photodiode PD is charged up to a predetermined initial potential between each gate scanning.

Scrubbing refers to initializing the X-ray detector 100 by resetting image lags remaining in the photodiodes PD after irradiating X-rays. In addition, scrubbing is conducted in order to maintain an appropriate bias potential between the two ends of the photodiodes PD between pauses. Also, scrubbing is conducted to reduce a delay of the photodiodes PD or an effect of incomplete charge recovery of the photodiodes PD. After exposure, an amount of charge that is needed to recover an initial potential between the two ends of the photodiodes PD is proportional to the amount of charge integrated in a unit area of each light sensing pixel P over the time that the X-rays are exposed, and/or the amount of X-rays detected in each light sensing pixel P.

According to some embodiments, during one gate scanning time ts of the first scrubbing period A, a plurality of gate pulses are applied to each row of light sensing pixels P. Application of a plurality of gate pulses will now be described in detail.

In the offset read out period B, the X-ray detector 100 maintains an idle state during an offset window time TW1. Here, the transistors TR are turned off.

After the offset window time TW1 has passed, the X-ray detector 100 performs an offset read out TR1 for reading an electrical signal of each light sensing pixel P.

For example, a gate pulse is sequentially applied from the gate driver 130 to the plurality of gate lines GL. The transistors Tr of the light sensing pixels P are turned on by the gate pulse. Electrical signals output by the transistors Tr turned on by the gate pulse are read out via the data lines DL and are transmitted to the read out integrated circuit 150.

The signal processor 300 obtains an offset image based on the signal output by the read out integrated circuit 150. For example, the offset image may be averaged with a previously obtained offset image to obtain an updated offset image.

An exposure image acquisition period includes a second scrubbing period C and an X-ray read out period D.

In the second scrubbing period C, the X-ray detector 100 performs gate scanning n times. The value of n may correspond to any number of values. According to some embodiments, n is greater than or equal to two. The gate scanning time ts corresponds to a time when a gate pulse is sequentially applied from the first gate line to the last gate line to perform gate scanning. The gate scanning interval ti may be 0. Gate scanning is performed n times during the total gate scanning time TS.

For example, a gate pulse is sequentially applied from the gate driver 130 to the plurality of gate lines GL, and each row of transistors Tr is sequentially turned on by the gate pulse. The reset devices SW of the signal detecting unit 160 are turned on and are electrically connected to the two ends of the capacitors CP. That is, data that is collected during scrubbing is discarded. Electrical signals of the data lines DL are discharged by the reset devices SW. Also, during the second scrubbing period C, each photodiode PD is charged up to a predetermined initial potential between gate scannings.

According to embodiments, during one gate scanning time ts of the second scrubbing period C, a plurality of gate pulses are applied to each row of light sensing pixels P. Application of a plurality of gate pulses will now be described in detail.

When gate scanning is completed, the reset devices SW are turned off.

In the X-ray read out period D, the X-ray detector 100 is exposed to X-rays for a period of X-ray window time TW2. Here, the transistors Tr are turned off. When the X-ray detector 100 is exposed to X-rays, the X-rays are absorbed by the scintillator 420, and light that is emitted from the scintillator 420 to the photodiodes PD partially turns on the photodiodes D. The amount of the light emitted from the scintillator 420 to the photodiode PD is proportional to an amount of X-rays absorbed by the scintillator 420.

After the X-ray window time TW2 has passed, the X-ray detector 100 performs an X-ray read out TR2 for reading an electrical signal of each light sensing pixel P.

For example, a gate pulse is sequentially applied from the gate driver 130 to a plurality of gate lines GL. The transistor Tr of each of the light sensing pixels P is turned on by the gate pulse. An electrical signal generated in the photodiodes PD during the X-ray window time TW2 is transmitted to the transistors Tr turned on by the gate pulse. Electrical signals output by the transistors Tr turned on by the gate pulse are read out and transmitted to the read out integrated circuit 150 via the data lines DL.

The signal processor 300 obtains an X-ray image based on the signal output by the read out integrated circuit 150. The signal processor 300 subtracts the updated offset image from the X-ray image to generate an offset-corrected X-ray image.

Figure 6:
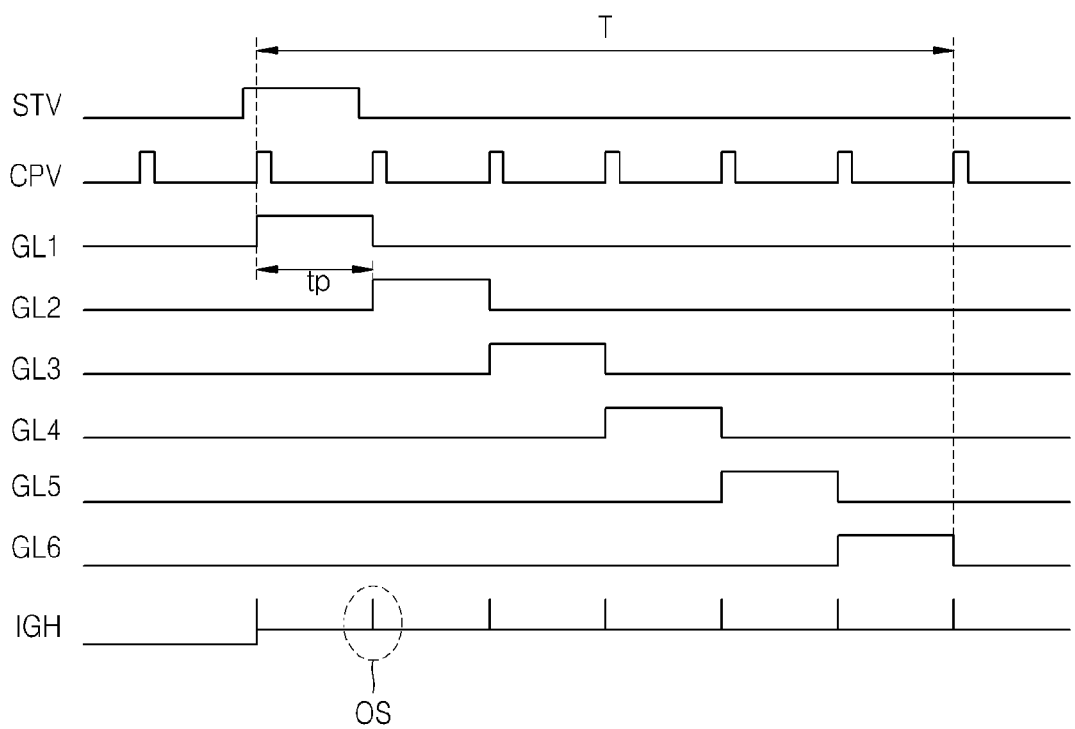
FIG. 6 is a timing diagram illustrating an example of a gate scanning operation according to some embodiments.

FIG. 6 is a timing diagram illustrating an example of a gate scanning operation according to some embodiments.

As illustrated in FIG. 6, a gate pulse is applied to each gate line GL during the first scrubbing period A and the second scrubbing period C of FIG. 5 to perform scrubbing. FIG. 6 illustrates six gate lines GL1 through GL6, but the number of gate lines may vary according to different embodiments. Additionally, FIG. 6 illustrates one gate scanning operation, and a gate scanning period T of FIG. 6 corresponds to the gate scanning time ts of FIG. 5.

Gate scanning is initiated in response to a start pulse of a start signal STV. While the start pulse is applied, a gate pulse is sequentially applied starting from the first gate line GL1, in response to a clock pulse of a clock signal CPV. According to some examples, a pulse width tp of the gate pulse has the same length as a period of a clock signal CPV. As illustrated in FIG. 6, as a gate pulse is sequentially applied to the gate lines GL1 through GL6, the switching devices Tr of the plurality of light sensing pixels P of the pixel unit 110 are sequentially turned on row by row to perform gate scanning. IGH denotes a current flowing through each data line DL.

FIG. 7 is a table showing initialization effects according to number of gate scans and gate-on time.

During scrubbing, gate scanning needs to be performed a plurality of times in order to appropriately initialize an X-ray detector and remove image lag. The initialization effect increases the longer a gate-on time and the greater a gate scanning frequency. However, during one gate scanning, the initialization effect is greatest when a gate pulse is first applied, and decreases gradually thereafter. This is because a current flowing through a transistor Tr is large when the transistor Tr is turned on as a gate pulse is applied, and thus the initialization effect is greatest when the transistor Tr is turned on. Accordingly, during the first scrubbing period A and the second scrubbing period C, in order to increase the initialization effect, it is more efficient to increase the number of gate scannings than to increase the gate-on time in terms of the initialization effect.

The table of FIG. 7 illustrates values showing initialization effects. The smaller the values represented in FIG. 7, the greater the initialization effects. With reference to FIG. 7, when a gate-on time is 15 μs and a number of gate scans is two, an initialization effect is 9202; when a gate-on time is 10 μs and a number of gate scans is three, an initialization effect is 8561. Accordingly, even though the scrubbing time is the same (i.e., about 30 μs), greater initialization effects result when the number of gate scans increases. Other data of FIG. 7 shows that greater initialization effects are obtained when gate scanning is performed more times during the same period of scrubbing time.

Therefore, increasing the gate-on time and increasing the number of gate scans both increase the total gate scanning time TS of the first scrubbing period A and the second scrubbing period C, and this increases an image cycle time of an X-ray photographing.

To reduce the scrubbing time, a frequency of a clock signal CPV input to the gate driver 130 may be increased. However, if this method is used, the gate-on time is also reduced, and a reset effect of the photodiodes PD by one gate scanning is reduced, thereby increasing the number of times of the gate scans for the scrubbing. As a result, increasing only the frequency of the clock signal CPV in the conventional driving method has little effect in reducing the scrubbing time.

An alternative method to reducing the scrubbing time is to apply a gate pulse to all gate lines GL1 through GL6 at the same time so as to turn on the transistors Tr of all light sensing pixels P. However, when a gate pulse is applied, a current pulse OS is instantaneously generated as a current of the data lines DL as illustrated in FIG. 6. This is because a current instantaneously increases when a transistor Tr is turned on by a gate pulse. Accordingly, as described above, when a gate pulse is applied to all gate lines GL1 through GL6 at the same time to turn on the transistors Tr of all light sensing pixels P at the same time, an inrush current may be output to the read out integrated circuit 150 via the data lines DL. Consequently, this driving method is burdensome on the read out integrated circuit 150, and a life time of the read out integrated circuit 150 may be reduced accordingly. Furthermore, in order to output a detection signal from each light sensing pixel P, driving power needs to be supplied to all light sensing pixels P, and this is again burdensome on the bias supplying unit 120.

Figure 8:
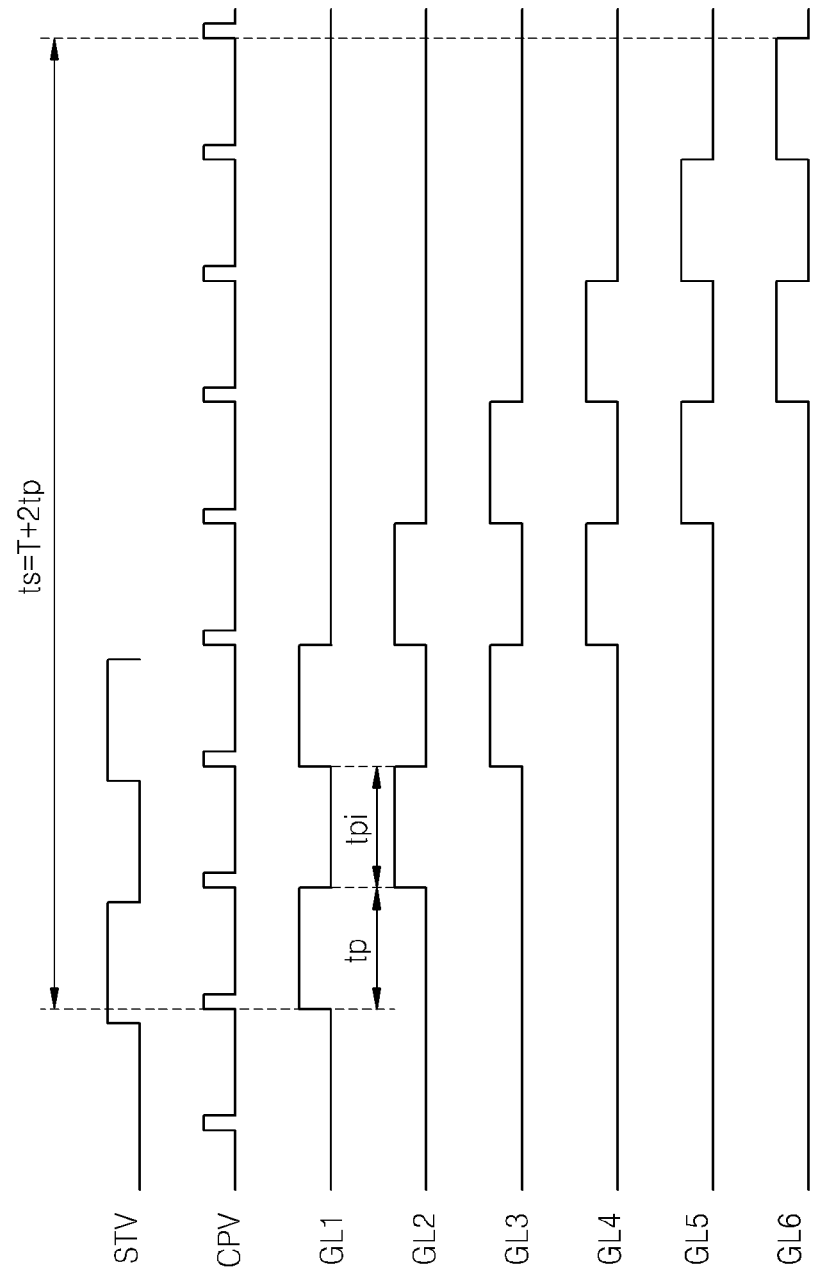
FIG. 8 is a timing diagram illustrating a driving operation according to some embodiments.

FIG. 8 is a timing diagram illustrating a driving operation of an X-ray detector 100 according to some embodiments.

The gate driver 130 according to some embodiments generates a gate pulse such that a plurality of gate pulses are applied to the light sensing pixels P of each row during each gate scanning and sequentially outputs the gate pulse to the plurality of gate lines GL1 through GL6, as illustrated in FIG. 8, to apply the plurality of gate pulses to each row of light sensing pixels P. With reference to the embodiment of FIG. 8, two gate pulses are applied to each gate line during one gate scanning.

A gate pulse applied to each gate line (GL1 through GL6) may be generated by, for example, a shift register (not shown). According to some embodiments, in order to apply a plurality of gate pulses to each gate line (GL1 through GL6) during one gate scanning, a start signal STV having a plurality of initiation pulses may be applied by the timing controller 180 to the shift register. The shift register sequentially generates gate pulses using a cascade method according to the start signal STV having a plurality of initiation pulses, thereby sequentially applying a plurality of gate pulses to each of the gate lines GL1 through GL6. For example, as illustrated in FIG. 8, when the start signal STV has two initiation pulses and is applied to the shift register, two gate pulses are sequentially applied to each of the gate lines GL1 through GL6 during one gate scanning.

The plurality of gate pulses applied to each of the gate lines GL1 through GL6 may be generated to have a predetermined gate pulse interval tpi having a gate off level voltage between the plurality of gate pulses. The gate off level voltage refers to a voltage level at which the transistors Tr of the light sensing pixels P are turned off. With reference to FIG. 8, the gate pulse interval tpi is one clock cycle but the embodiment of the present invention is not limited thereto. The gate pulse interval tpi may be variable according to some embodiments. As the gate pulse interval tpi is set, the number of light sensing pixels P in which the transistors Tr are turned on by gate scanning during one clock cycle is limited. Accordingly, a burden is not placed on the read out integrated circuit 150 due to a current pulse that is instantaneously generated in the data lines DL.

Furthermore, a gate pulse illustrated in FIG. 8 has a gate pulse width tp corresponding to one clock cycle. However, a gate pulse may instead have a gate pulse width tp of a plurality of clock cycles.

According to some embodiments, when the number of gate pulses applied during one gate scanning is increased, an initialization effect by one gate scanning is increased. For example, when two gate pulses are applied to each light sensing pixel P during one gate scanning, the gate scanning time ts is maintained almost the same in comparison to the conventional method of FIG. 6, and the initialization effect by one gate scanning is nearly doubled. Additionally, when three gate pulses are applied to each light sensing pixel P during one gate scanning, the gate scanning time ts is maintained at almost the same time period in comparison to the driving method of FIG. 6. Therefore, the initialization effect by one gate scanning is nearly tripled.

Additionally, according to some embodiments, the total gate scanning time TS needed for the same amount of initialization effect is reduced significantly. For example, when two gate pulses are applied to each light sensing pixel P during one gate scanning as illustrated in FIG. 8, the total gate scanning time TS is reduced by nearly 50% in comparison to the driving method of FIG. 6, thereby greatly reducing an image cycle time of an X-ray photographing operation. Furthermore, when three gate pulses are applied to each light sensing pixel P during one gate scanning, the total gate scanning time TS may be reduced by nearly 33%, thereby greatly reducing an image cycle time of an X-ray photographing operation.

Figure 9:
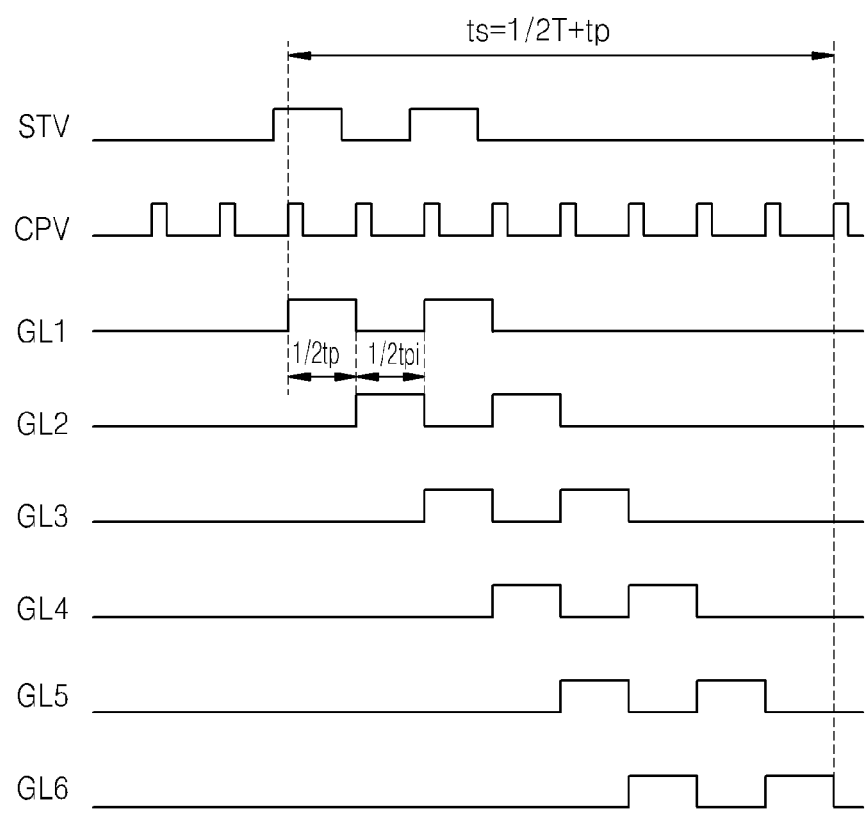
FIG. 9 is a timing diagram illustrating a driving operation according to some embodiments.

FIG. 9 is a timing diagram illustrating a driving method according to some embodiments.

According to some embodiments, the total gate scanning time TS may be reduced by doubling a frequency of a clock signal CPV. For example, as illustrated in FIG. 9, when a frequency of a clock signal CPV is doubled compared to a previous frequency, while maintaining an initialization effect by one gate scanning, one period of gate scanning time ts may be reduced by nearly 50%. However, as described above with reference to FIG. 7, even though the sum of the total gate-on time is the same, a greater number of gate scans is more advantageous in terms of the initialization effect. Thus, according to some embodiments, one period of gate scanning time ts may be reduced compared to the driving method illustrated in FIG. 6. However, the initialization effect may still be further increased. Therefore, if four gate scans are required during a first or second scrubbing period A or C based on the driving method illustrated in FIG. 6, a frequency of a clock signal may be doubled from a previous frequency, and two gate pulses are applied to each of the gate lines GL1 through GL6 during one gate scanning, thereby reducing the total gate scanning time TS nearly by 50%.

According to some embodiments, an initialization time of the X-ray detectors may be reduced while an image lag removing efficiency is maintained.

Furthermore, according to some embodiments, an initialization time of the X-ray detectors may be reduced while minimally increasing a burden on a power unit and a read out integrated circuit.

According to some embodiments described above, an X-ray detector is disclosed. The X-ray detector includes a plurality of light sensing pixels each comprising a photodiode configured to generate an electrical detection signal corresponding to incident light and a switching device for transmitting the detection signal, a gate driver configured to supply a gate pulse to the switching device via a plurality of gate lines, wherein the gate pulse turns on the switching device, and a read out integrated circuit configured to read out the detection signal from the plurality of light sensing pixels. During a scrubbing period, in which a gate scan is performed at least once to initialize the photodiodes of the plurality of light sensing pixels, a plurality of gate pulses are supplied to each gate line during each gate scan.

The plurality of gate pulses supplied to each of the gate lines may be sequentially supplied to the plurality of gate lines. The plurality of gate pulses supplied to each gate line may partially overlap with the plurality of gate pulses supplied to at least one of another set of gate lines.

According to some embodiments, a gate pulse interval having a gate off level may be included between the plurality of gate pulses supplied to each gate line during each gate scan. The gate driver may include a timing controller for supplying an initialization signal having a plurality of initialization pulses. The gate driver may generate the gate pulses according to the initialization signal.

According to some embodiments, a method of driving an X-ray detector is disclosed. The method includes, during a scrubbing period in which gate scanning is performed at least once to initialize photodiodes of a plurality of light sensing pixels formed in the X-ray detector, generating a gate pulse for turning on a switching device formed in each of the plurality of light sensing pixels, the gate pulse configured to transmit a detection signal from the photodiodes of the plurality of light sensing pixels. The method further includes transmitting the gate pulse to the switching device of each of the plurality of light sensing pixels via a plurality of gate lines, and outputting the detection signal from the plurality of light sensing pixels through a plurality of data lines. Additionally, generating the gate pulse includes generating a plurality of gate pulses for each of the gate lines during each gate scan.

In the transmitting the gate pulse, the plurality of gate pulses may be sequentially supplied to each of the gate lines. The plurality of gate pulses supplied to each gate line may partially overlap with the plurality of gate pulses supplied to at least one of another set of gate lines.

A gate pulse interval having a gate off level may be included between the plurality of gate pulses supplied during each gate scan. The method may further include providing an initialization signal including a plurality of initialization pulses. In generating the gate pulse, the gate pulse may be generated according to the initialization signal.

While this invention has been particularly shown and described with reference to exemplary embodiments thereof, it will be understood by those of skill in the art that various modifications in form and details may be made without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims.

What is claimed is:

1. An X-ray detector comprising:
 a plurality of light sensing pixels each comprising a photodiode configured to generate an electrical detection signal corresponding to incident light and a switching device for transmitting the detection signal;
 a gate driver configured to supply a gate pulse to the switching device via a plurality of gate lines, wherein the gate pulse turns on the switching device; and
 a read out integrated circuit configured to read out the detection signal from the plurality of light sensing pixels,
 wherein in a scrubbing period, in which a gate scan is performed at least once to initialize the photodiodes of the plurality of light sensing pixels, a plurality of gate pulses are supplied to each gate line during each gate scan, wherein a gate pulse interval having a gate off level is included between the two or more gate pulses supplied to each gate line during each gate scan, and wherein a second of the two or more pulses supplied to a first one of the gate lines is applied at least partially after the fist pulse of the two or more pulses applied to a subsequent one of the gate line.

2. The X-ray detector of claim 1, wherein the two or more gate pulses supplied to each of the gate lines are sequentially supplied to the plurality of gate lines.

3. The X-ray detector of claim 2, wherein the two or more gate pulses supplied to each gate line partially overlap with the two or more gate pulses supplied to at least one of other gate lines.

4. The X-ray detector of claim 1, wherein the gate driver comprises a timing controller for supplying an initialization signal having a plurality of initialization pulses, and wherein the gate driver generates the two or more gate pulses according to the initialization signal.

5. A method of driving the X-ray detector of claim 1, the method comprising, during a scrubbing period in which gate scanning is performed at least once to initialize photodiodes of a plurality of light sensing pixels formed in the X-ray detector:
 generating a gate pulse for turning on a switching device formed in each of the plurality of light sensing pixels, the gate pulse configured to transmit a detection signal from the photodiodes of the plurality of light sensing pixels;
 transmitting the gate pulse to the switching device of each of the plurality of light sensing pixels via a plurality of gate lines; and
 outputting the detection signal from the plurality of light sensing pixels through a plurality of data lines,
 wherein, generating a gate pulse comprises, generating two or more gate pulses for each of the gate lines during each gate scan, wherein a gate pulse interval having a gate off level is included between the two or more gate pulses supplied to each gate line during each gate scan.

6. The method of claim 5, wherein transmitting the gate pulse comprises sequentially supplying the two or more gate pulses to each of the gate lines.

7. The method of claim 6, wherein the two or more gate pulses supplied to each gate line partially overlap with the two or more gate pulses supplied to at least one of other gate lines.

8. The method of claim 5, further comprising providing an initialization signal including a plurality of initialization pulses, wherein generating the two or more gate pulses comprises generating the two or more gate pulses according to the initialization signal.

* * * * *